US010750713B2

(12) United States Patent
Rathman et al.

(10) Patent No.: US 10,750,713 B2
(45) Date of Patent: Aug. 25, 2020

(54) PET KENNEL

(71) Applicant: B&B Kustom Kennels, LLC, Larkspur, CO (US)

(72) Inventors: Bethany Rathman, Larkspur, CO (US); Brody Rathman, Larkspur, CO (US)

(73) Assignee: B&B Kustom Kennels, LLC, Larkspur, CO (US)

( * ) Notice: Subject to any disclaimer, the term of this patent is extended or adjusted under 35 U.S.C. 154(b) by 695 days.

(21) Appl. No.: 15/393,750

(22) Filed: Dec. 29, 2016

(65) Prior Publication Data

US 2017/0188538 A1  Jul. 6, 2017

Related U.S. Application Data

(60) Provisional application No. 62/274,654, filed on Jan. 4, 2016.

(51) Int. Cl.
*A01K 1/03* (2006.01)
*A01K 1/00* (2006.01)
*A01K 1/015* (2006.01)
*A01K 1/02* (2006.01)

(52) U.S. Cl.
CPC .......... *A01K 1/0005* (2013.01); *A01K 1/0029* (2013.01); *A01K 1/015* (2013.01); *A01K 1/0245* (2013.01); *A01K 1/03* (2013.01)

(58) Field of Classification Search
CPC ........ A01K 1/033; A01K 1/035; A01K 1/034; A01K 1/0353; A01K 31/06; A01K 1/0245; A01K 1/03
USPC ....... 119/472, 796, 481, 165, 455, 473, 482, 119/484, 501, 452, 459
See application file for complete search history.

(56) References Cited

U.S. PATENT DOCUMENTS

D176,930 S   2/1956  Saba
D211,774 S   7/1968  Verner et al.
(Continued)

FOREIGN PATENT DOCUMENTS

CA   2712012 A1 *  7/2011  ............... A01K 1/03
CA   2838295 A1 *  7/2015  ............... A01K 1/03
(Continued)

OTHER PUBLICATIONS

Co-owned U.S. Appl. No. 29/640,385, filed Mar. 14, 2018 (not yet published).
(Continued)

*Primary Examiner* — Yvonne R Abbott-Lewis
(74) *Attorney, Agent, or Firm* — Trenner Law Firm, LLC; Mark D. Trenner (57) ABSTRACT

A pet kennel is disclosed as it may be manufactured to appear as furniture. An example of the pet kennel may include a housing having a floor, a top, and four sides, wherein the floor and the top are wooden, and at least one of the sides has metal rods in a wooden frame. The example pet kennel may also include a containment area formed within the housing, the containment area sufficiently large to fit multiple animals. At least one divider may be installed to separate the containment area into distinct living space. The at least one divider may be removed to provide a common living space. The at least one pet kennel may also include at least one door to the containment area, and a lock on the at least one door.

3 Claims, 10 Drawing Sheets

(56) References Cited

U.S. PATENT DOCUMENTS

| | | | | |
|---|---|---|---|---|
| 3,815,549 | A * | 6/1974 | Opmeer | A01K 31/06 119/459 |
| D274,152 | S | 6/1984 | Fleming | |
| 4,844,016 | A * | 7/1989 | Filosa | A01K 1/03 119/481 |
| 5,044,317 | A * | 9/1991 | Shean | A01K 1/03 119/472 |
| D320,516 | S | 10/1991 | Grey | |
| 5,134,969 | A * | 8/1992 | Mason | A01K 1/031 119/472 |
| 5,144,910 | A * | 9/1992 | Darby | A01K 1/0245 119/496 |
| D330,274 | S | 10/1992 | Smith et al. | |
| D360,491 | S | 7/1995 | Campbell | |
| D432,818 | S | 10/2000 | Hutton | |
| 6,286,458 | B1 * | 9/2001 | Rawson | A01K 1/0107 119/161 |
| D483,156 | S | 12/2003 | Simpson | |
| 6,971,333 | B1 * | 12/2005 | Hearrell | A01K 1/0245 119/473 |
| D519,685 | S * | 4/2006 | Scarpaci | D30/108 |
| D520,190 | S * | 5/2006 | Joyner | D30/108 |
| 7,044,081 | B1 * | 5/2006 | Bridges | A01K 63/003 119/246 |
| 7,234,415 | B2 | 6/2007 | Dietz | |
| D554,389 | S * | 11/2007 | Pierce | D30/108 |
| D569,053 | S | 5/2008 | Lee | |
| D582,610 | S | 12/2008 | Warman | |
| D609,407 | S | 2/2010 | Henley et al. | |
| 7,681,533 | B2 | 3/2010 | Dietz | |
| D616,157 | S | 5/2010 | Iranyi | |
| D616,617 | S | 5/2010 | Cirincione et al. | |
| D640,837 | S | 6/2011 | Henley et al. | |
| 7,997,234 | B1 * | 8/2011 | Hughey | A01K 1/034 119/496 |
| D650,953 | S | 12/2011 | Lee et al. | |
| 8,127,718 | B2 * | 3/2012 | Hoegh | A01K 1/0017 119/481 |
| 8,544,417 | B2 * | 10/2013 | Sangl | A01K 1/0245 119/455 |
| D704,901 | S * | 5/2014 | Diskin | D30/108 |
| D723,225 | S | 2/2015 | Lee et al. | |
| D821,038 | S | 6/2018 | Rathman et al. | |
| 2002/0152969 | A1 | 10/2002 | Grigsby et al. | |
| 2002/0158764 | A1 * | 10/2002 | Conway | A01K 1/033 340/573.3 |
| 2005/0120968 | A1 * | 6/2005 | Dorsey | A01K 1/0107 119/165 |
| 2005/0161000 | A1 * | 7/2005 | Noyes | A01K 1/035 119/484 |
| 2006/0112897 | A1 | 6/2006 | Moore | |
| 2007/0089683 | A1 * | 4/2007 | Roberts | A01K 1/03 119/477 |
| 2009/0031964 | A1 * | 2/2009 | Proxmire | A01K 1/033 119/484 |
| 2009/0038558 | A1 * | 2/2009 | Schulte | A01K 1/0245 119/496 |
| 2010/0043720 | A1 * | 2/2010 | Yelverton | A01K 1/0245 119/496 |
| 2013/0068172 | A1 * | 3/2013 | Hoegh | A01K 1/0017 119/481 |
| 2014/0026819 | A1 * | 1/2014 | White | A01K 1/03 119/455 |
| 2017/0097169 | A1 | 4/2017 | Azevedo et al. | |
| 2019/0029216 | A1 * | 1/2019 | Volin | A01K 1/0107 |

FOREIGN PATENT DOCUMENTS

| | | |
|---|---|---|
| GR | 6004204-0001 | 9/2017 |
| GR | 6004204-003 | 9/2017 |
| JP | D1059881 | 2/2000 |
| WO | 2008082376 | 7/2008 |

OTHER PUBLICATIONS

Co-owned U.S. Appl. No. 29/640,389, filed Mar. 14, 2018 (not yet published).

Co-owned U.S. Appl. No. 29/640,399, filed Mar. 14, 2018 (not yet published).

https://bbkustomkennels.com/uploaded Jul. 2016 (Year: 2016).

* cited by examiner

PET KENNEL

CROSS REFERENCE TO RELATED APPLICATIONS

This application claims the priority benefit of U.S. Provisional Patent Application No. 62/274,654 filed Jan. 4, 2016 for "Pet Kennel" of Bethany Rathman and Brody Rathman, which is incorporated by reference in its entirety as though fully set forth herein.

BACKGROUND

Indoor kennels are typically sized to fit only one animal. Many pet owners often have multiple kennels in their house, one for each dog. Although larger kennels are available, these are usually configured to contain one large pet (e.g., a larger breed dog). Although more than one smaller dog may be contained within one of these larger kennels, this will not work if the pets do not get along with each other.

Nor do these kennels have a design or aesthetic appearance. These kennels are typically wire or plastic with slotted openings. As such, these kennels are often hidden from view (e.g., in the corner of a bedroom or laundry area) and not out in the open (e.g., in the family room or other living spaces).

BRIEF DESCRIPTION OF THE DRAWINGS

FIGS. 11-11A illustrate a lock actuator mechanism, wherein FIG. 11A is a detailed view of the portion shown in circle 11A in FIG. 11.

DETAILED DESCRIPTION

The example pet kennel disclosed herein solves the need that people have to kennel their pet(s) indoors with a kennel that also functions and appears aesthetically as a piece of furniture. In addition, the example pet kennel can be sufficiently large to fit multiple pets.

In an example, the pet kennel includes a removable divider. When positioned within the kennel, the divider provides separate containment areas for multiple pets. The divider can be removed from the kennel to provide a common living space.

Before continuing, it is noted that as used herein, the terms "includes" and "including" mean, but is not limited to, "includes" or "including" and "includes at least" or "including at least." The term "based on" means "based on" and "based at least in part on."

FIGS. 1-5 show various views of an example pet kennel 10. The pet kennel 10 has a unique design or aesthetic and can function as an article of furniture. For example, the pet kennel 10 may be configured as a dresser, table, sidebar, stand (e.g., for a television), or other item of furniture. In an example, the pet kennel 10 is made with wood (e.g., the housing 12) and metal rods (e.g., wrought iron bars). However, the pet kennel 10 can be manufactured of any suitable material.

Figure 1:
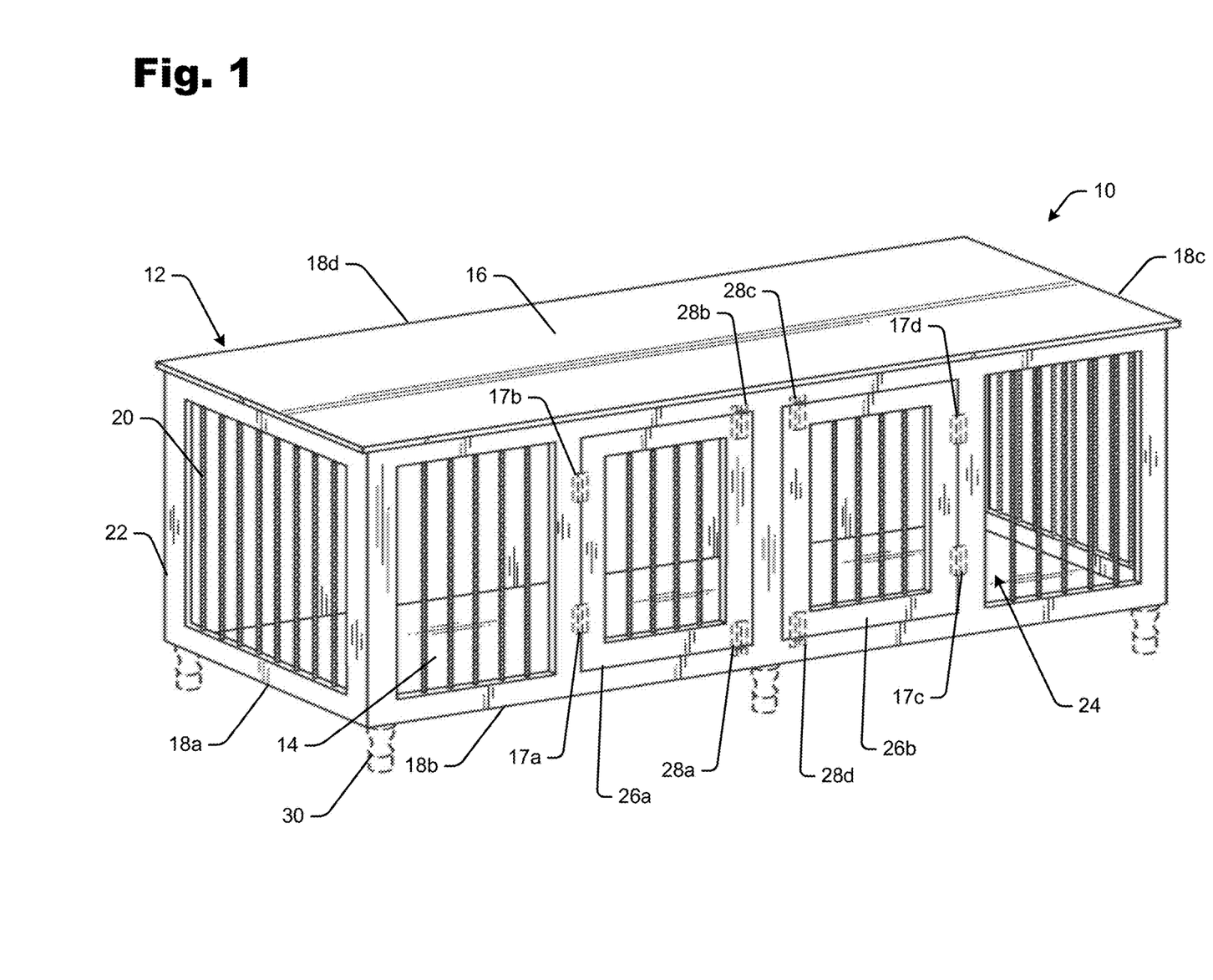
FIG. 1 is a top perspective view of an example pet kennel.
Figure 2:
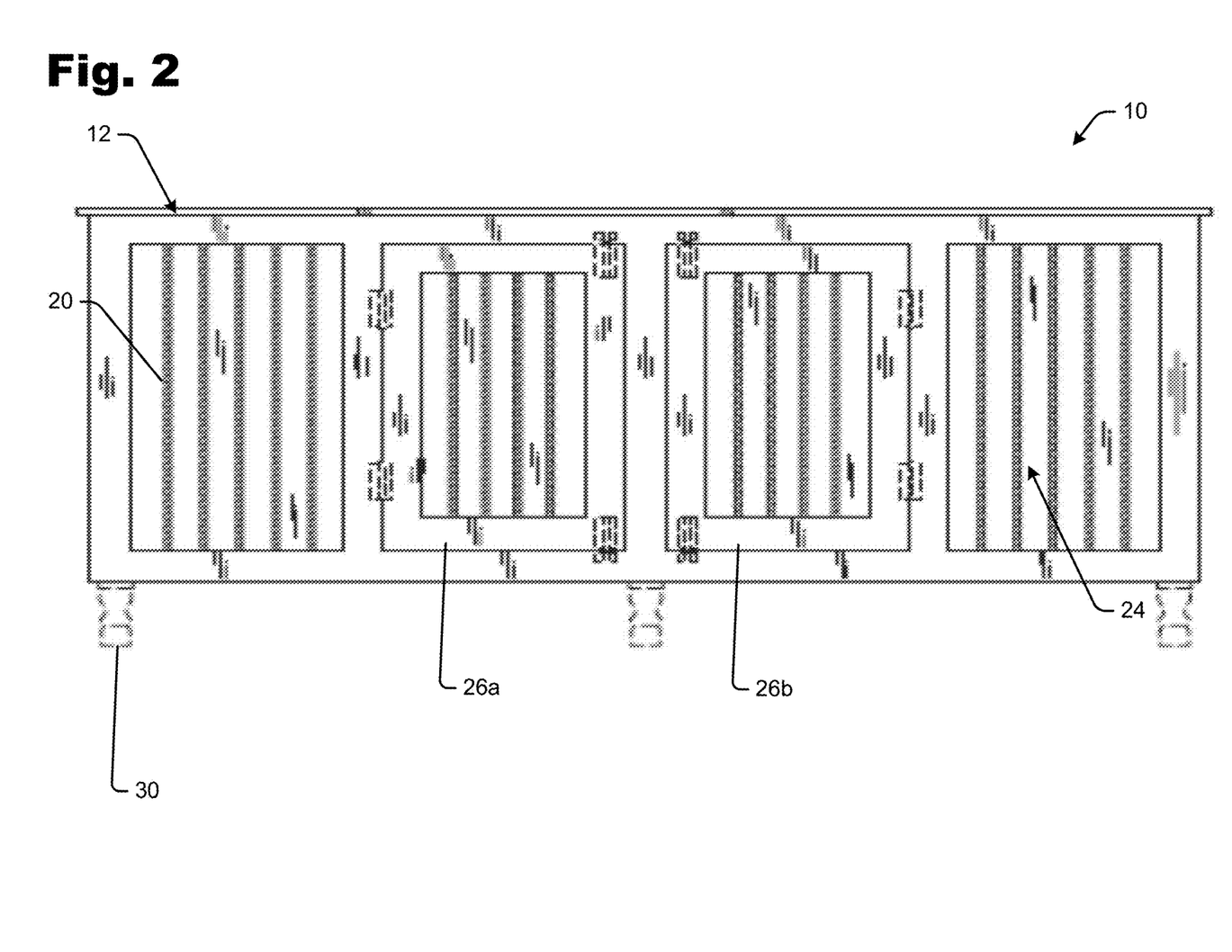
FIG. 2 is a front view of the example pet kennel corresponding to FIG. 1.
Figure 3:
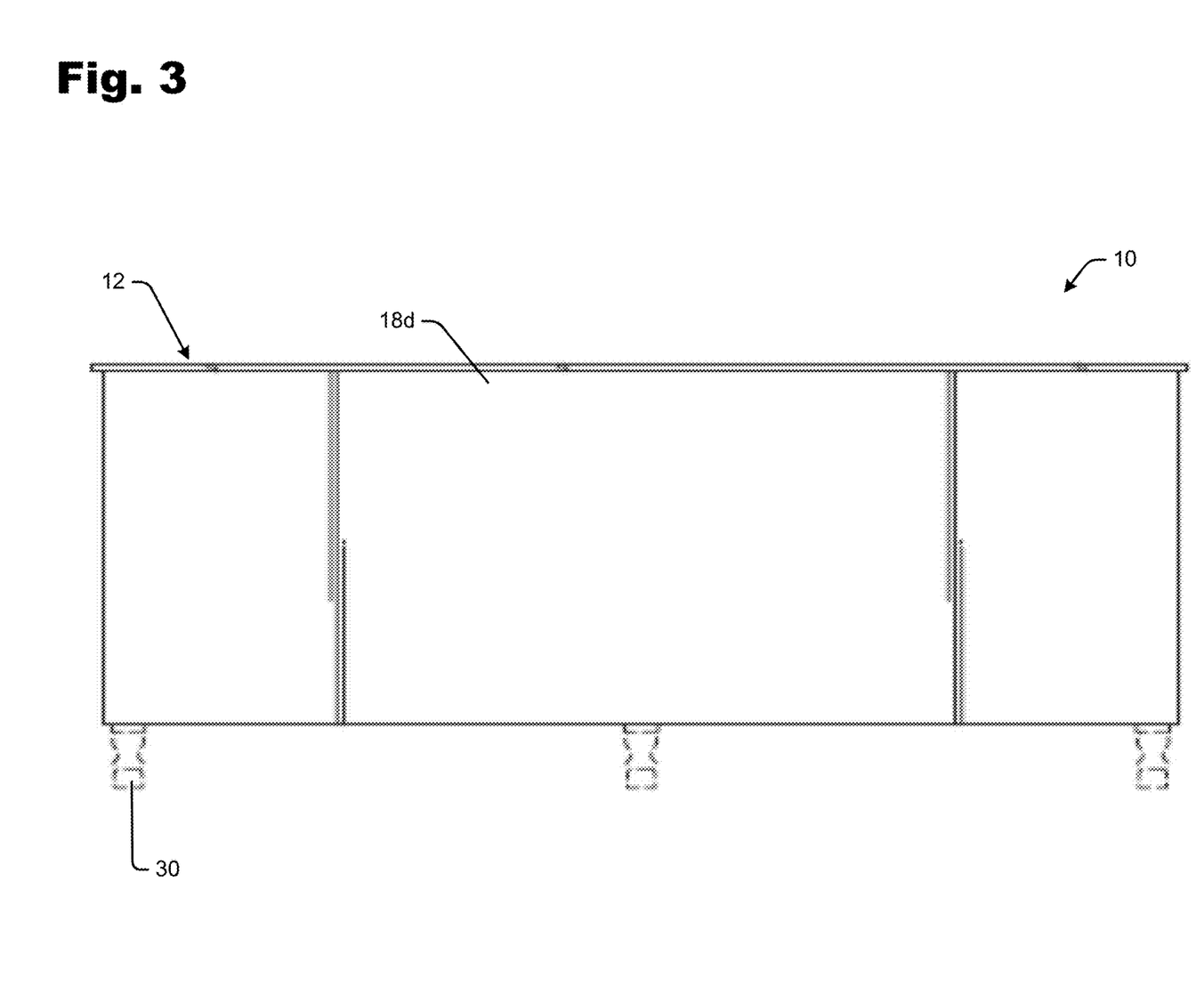
FIG. 3 is a back view of the example pet kennel corresponding to FIG. 1.
Figure 4:
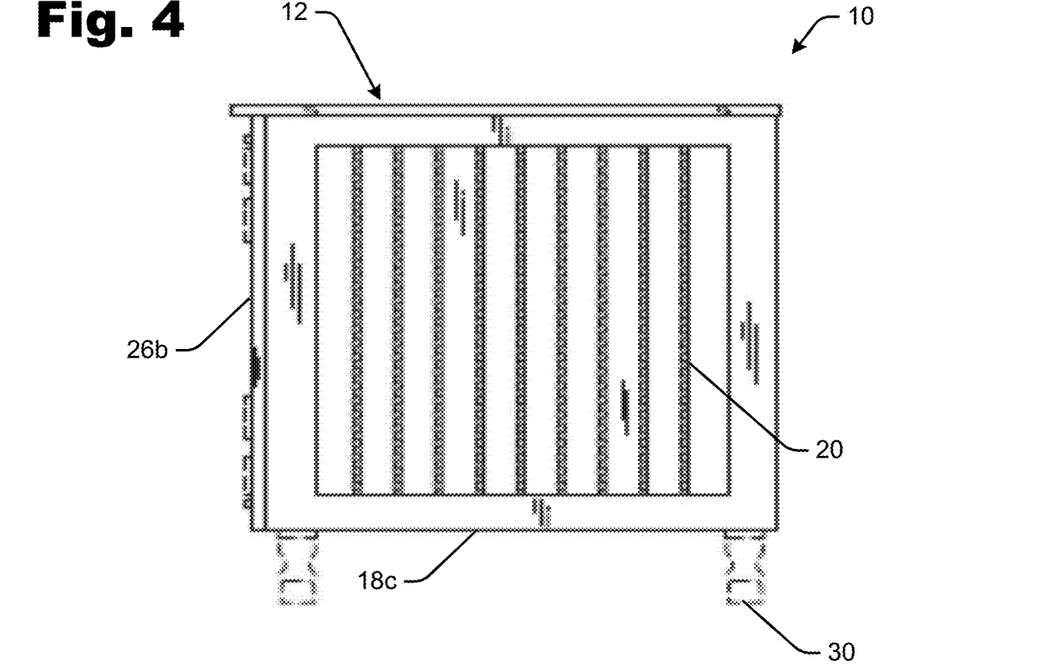
FIG. 4 is a right-side view of the example pet kennel corresponding to FIG. 1.
Figure 5:
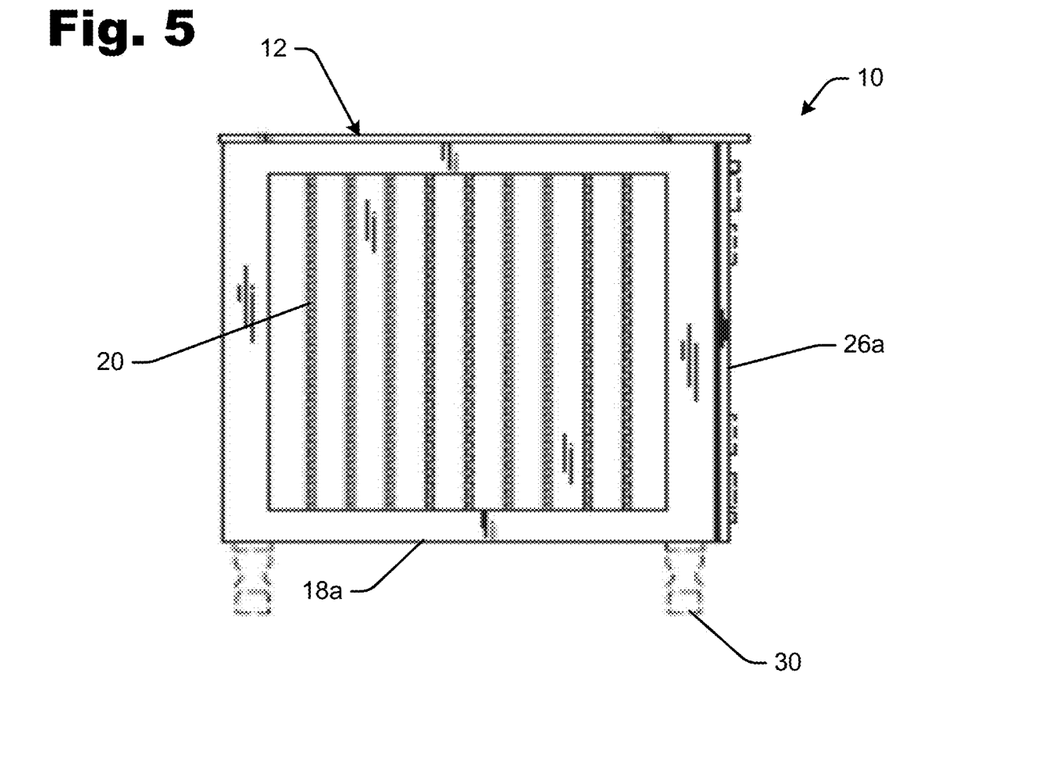
FIG. 5 is a left-side view of the example pet kennel corresponding to FIG. 1.

The example pet kennel 10 includes a housing 12 having a floor 14, a top 16, and four sides 18a-d. The floor 14 and the top 16 may be wood. At least one of the sides 18a-d has individual metal rods 20 separated from one another and mounted in a wooden frame 22. In FIG. 1, the front 18b and right and left side 18a-18b have metal rods 20 and the back 18d is solid. However, any combination of solid and open/bar sides may be provided. Indeed, bars 20 may even be provided on the top 16 and/or bottom 14.

Figure 6:
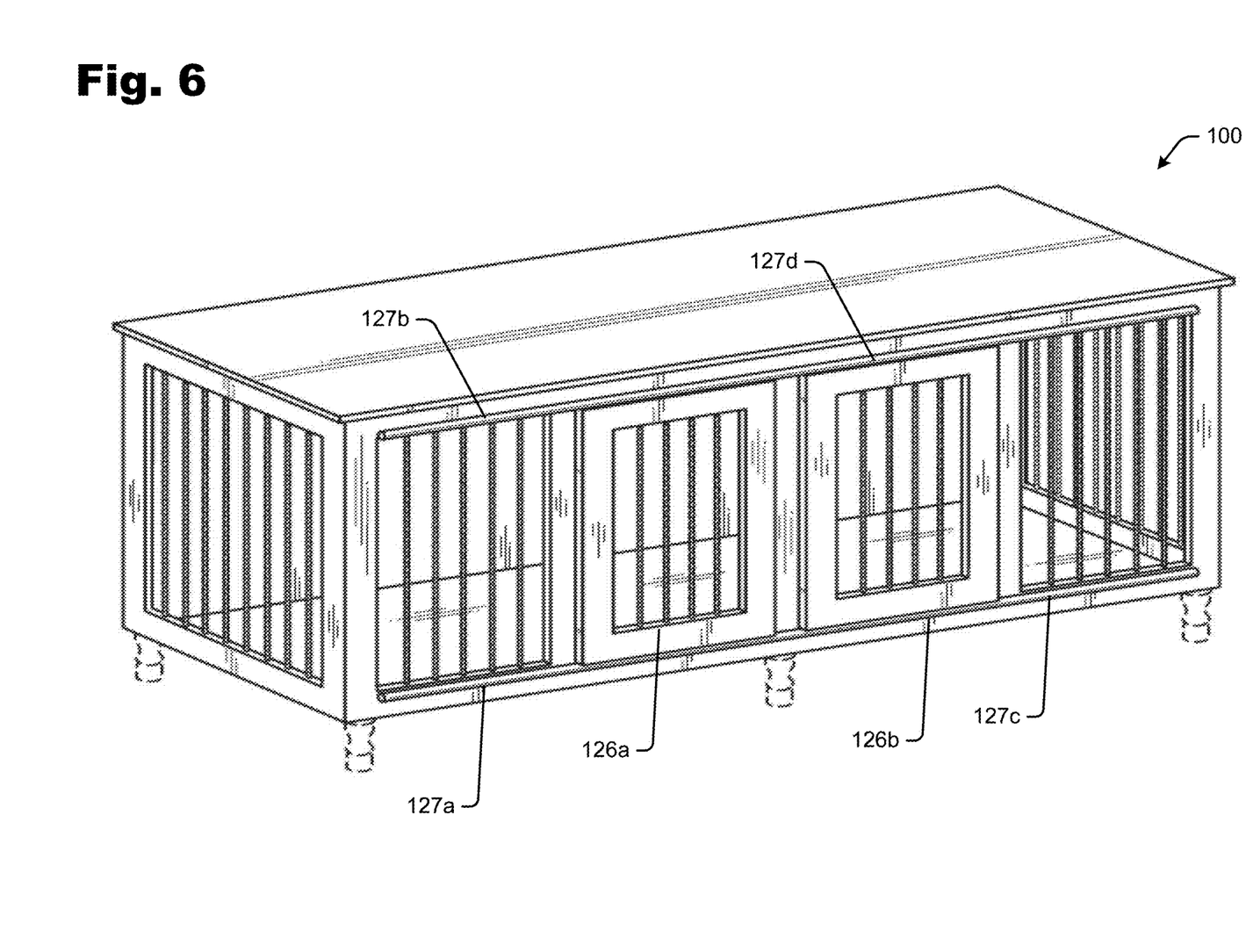
FIG. 6 is a top perspective view of another example pet kennel, wherein the doors are a sliding "barn door" style.

The example pet kennel 10 also includes a containment area 24 formed within the housing. The containment area 24 may be sufficiently large to fit multiple animals. At least one door may be provided to the containment area 24. In FIG. 1, two doors 26a and 26b are provided on hinges 17a-b and 17c-d. However, the pet kennel 10 may have one or more doors. Lock(s) 28a-b and 28c-d may be provided on the at least one door 26a and 26b. In an example, the door(s) may be hinged on one end and open on the opposite end, as shown in FIG. 1. In another example, the door(s) may slide, e.g., as shown in FIG. 6. Other mechanisms for opening/closing the doors are also contemplated.

In an example, at least one divider (see e.g., FIG. 10) may be installed to separate the containment area 24 into distinct living spaces. The divider may be removed from the containment area 24 to provide a common living space.

In an example, the pet kennel 10 may include one or more feet 30. In FIG. 1, the pet kennel 10 has six feet (e.g., two on each end and two in the middle). More or fewer feet or legs may be included. In addition, the pet kennel 10 is not limited to any particular type of feet or legs. For example, the pet kennel 10 may be raised by a frame or box. Indeed, the pet kennel 10 need not have any legs or be raised at all.

The example pet kennel 10 may be hand crafted. For example, the pet kennel 10 may be configured based on the size of the animal(s) and the recommended space for the particular size, weight and/or type of animal.

Before continuing, it should be noted that the examples described above are provided for purposes of illustration, and are not intended to be limiting. Other devices and/or device configurations may be utilized to carry out the operations described herein.

By way of illustration, the example pet kennel 10 may also have other aspects of an article or item of furniture. For example, the pet kennel 10 may include a shelf (not shown) on top and/or on the side(s), and/or drawers, extensions, etc. may be provided.

In addition, the pet kennel 10 may be fully assembled or delivered to customers unassembled or partially assembled so that they can assemble their own kennels. Yet other configurations will be readily understood by those having ordinary skill in the art after becoming familiar with the teachings herein.

FIG. 6 is a top perspective view of another example pet kennel 100 wherein the doors are a sliding "barn door" style door. In FIG. 6, the pet kennel 100 is shown having two sliding doors 126a and 126b, e.g., in rails 127a-b and 127c-d. However, the example pet kennel 100 may have one or multiple doors. For example, the pet kennel 100 may have a door that provides access to multiple living areas. Or for example, the pet kennel 100 may have separate doors, each providing access to separate living areas.

Figure 7:
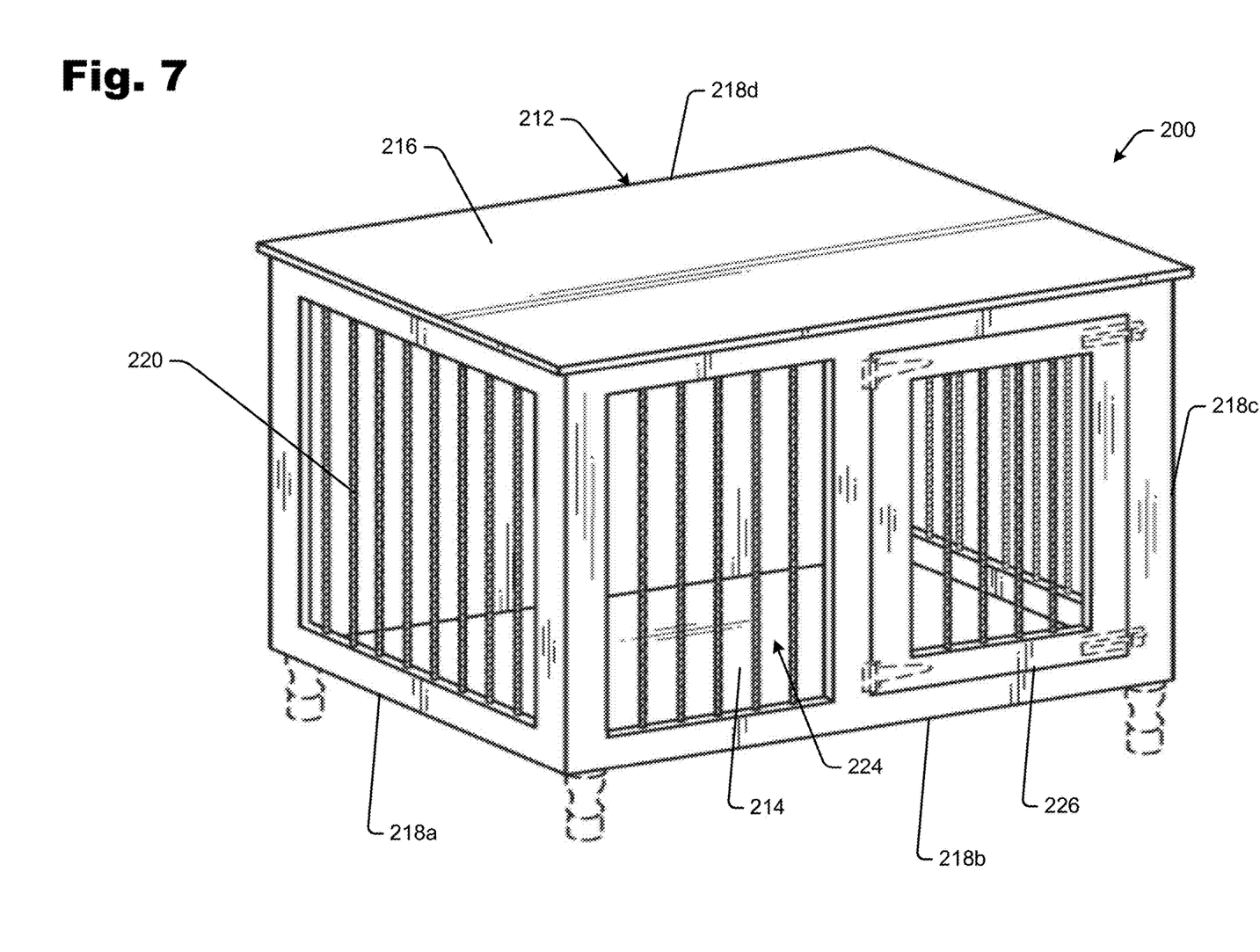
FIG. 7 is a top perspective view of another embodiment of the pet kennel.

FIG. 7 is a perspective view of another example pet kennel 200. The example pet kennel 200 is similar to that already described above for FIGS. 1-5, but made smaller for one or more smaller pets.

The example pet kennel 200 includes a housing 212 having a floor 214, a top 216, and four sides 218a-d. The floor 214 and the top 216 may be wood. At least one of the sides 218a-d has individual metal rods 220 separated from one another and mounted in a wooden frame 222. The example pet kennel 200 is shown in FIG. 7 having rods or bars 220 on three sides 218a-c and a solid back side 218d. However, any configuration of solid and open/bar sides may be provided as already discussed above with reference to the pet kennel 10.

The example pet kennel 200 also includes a containment area 224 formed within the housing 212. At least one door 226 may be provided to the containment area 224. A lock (e.g., slider locks 228) may be provided on the door 226.

Figure 8:
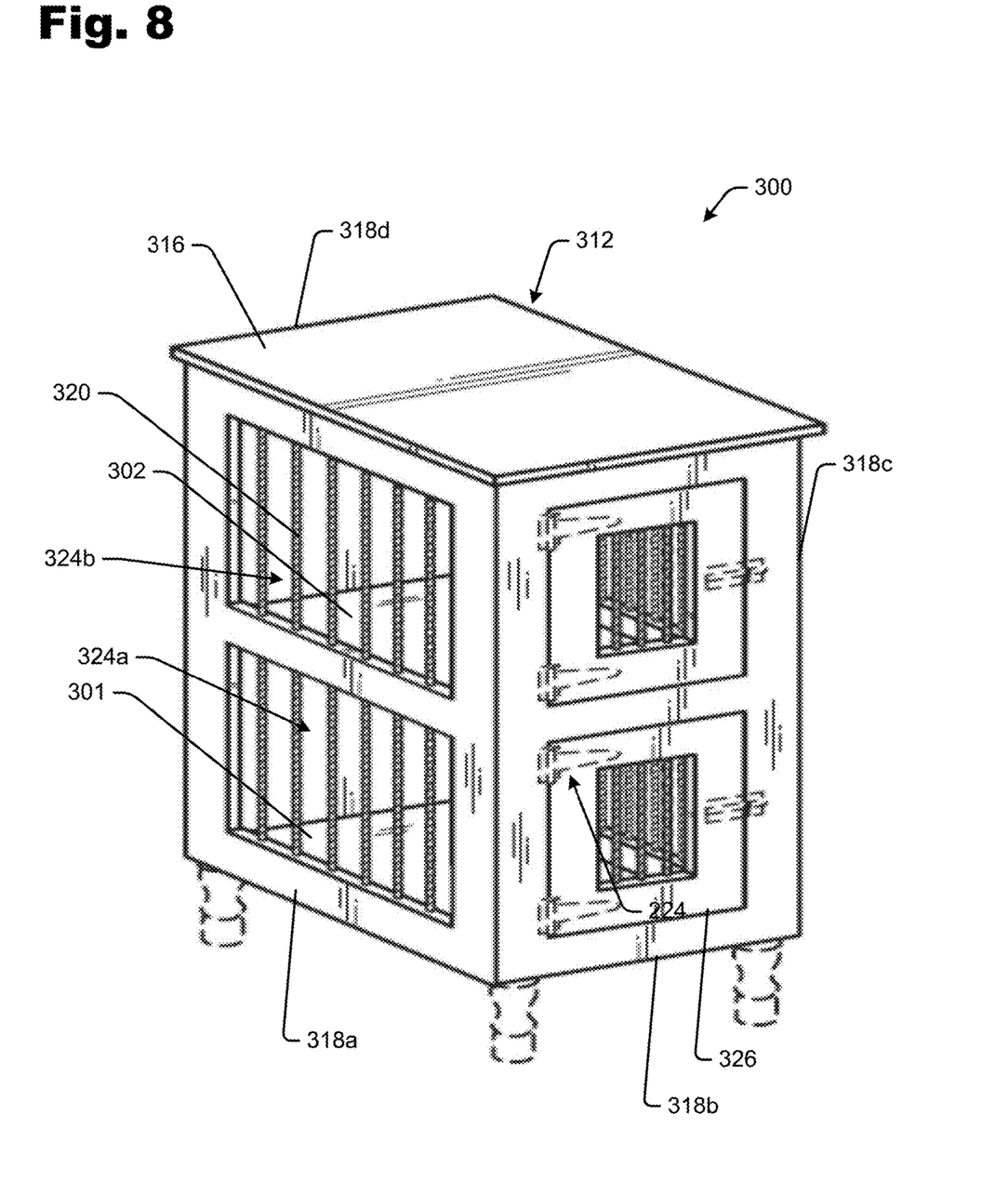
FIG. 8 is a top perspective view of another example pet kennel.
Figure 9:
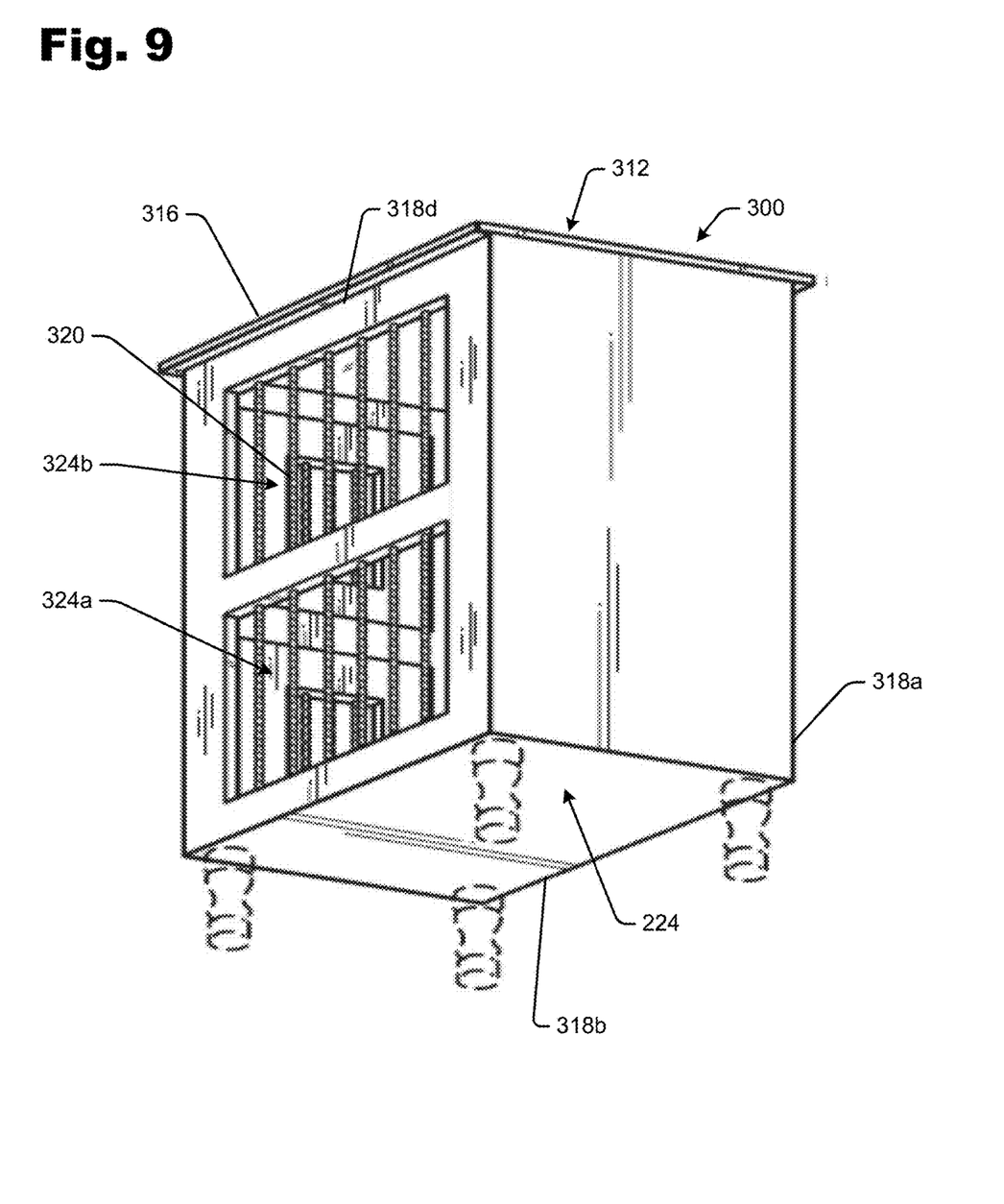
FIG. 9 is a bottom perspective view of the example pet kennel corresponding to FIG. 8.

FIGS. 8-9 are perspective views of another example pet kennel 300. The example pet kennel 300 is similar to that already described above, but includes a first floor 301 and a second floor 302.

The example pet kennel 300 includes a housing 312 having a top 316, and four sides 318a-d. In FIGS. 8-9, the floor 301 and 302 and the top 316 are wood. At least one of the sides 318a-d has individual metal rods separated from one another and mounted in a wooden frame.

The first floor 301 provides a lower containment area 324b and the second floor 302 provides an upper containment area 324a. The lower containment area 324b and the upper containment area 324a may be distinct containment areas. It is noted that any number of floors may be provided. In an example, the floors may be connected by openings so that animals (e.g., cats) could move between the floors.

In an example, the pet kennel 300 may include separate doors to each of the lower containment area 324b and the upper containment area 324a. At least one door 326a and 326b may be provided to the containment areas 324a and 324b. Any number of doors may be provided. For example, a single door may be provided to provide an opening to both containment areas 324a and 324b. A lock (e.g., slider locks 328b) may be provided on the door(s) 326a and 326b.

Figure 10:
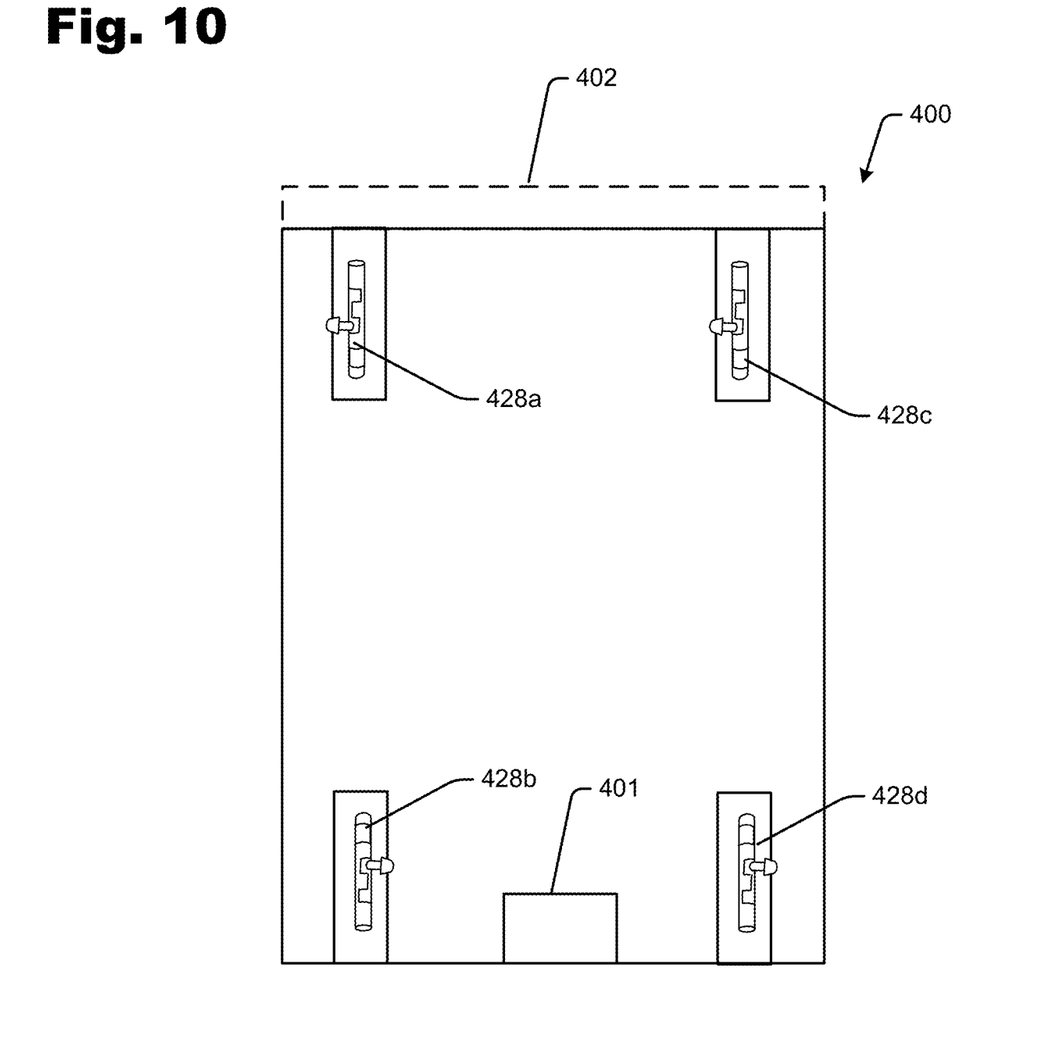
FIG. 10 shows an example divider of the example pet kennel.

FIG. 10 shows an example divider 400 of the example pet kennel (e.g., pet kennel 10 in FIG. 1). As described above, the example pet kennel may have the capacity to fit multiple animals, and the divider 400 may be provided to separate the animals in the containment area(s).

In an example, the divider 400 is removable. The example pet kennel can have more than one divider. The divider 400 for the kennel may also be made of wood and have hardware to fasten the divider in the kennel. In another example, the divider may include a frame with bars (similar to one of the sides, e.g., side 18a).

In an example, the divider 400 has a handle 401 (e.g., formed as part of the divider). In another example, the handle may be mounted on the divider 400. A lock (e.g., slider locks 428a-d) may be mounted to the divider 400, and holes or openings drilled into the floor, top, and/or side(s) of the pet kennel for the latch to slide into. The divider may also be slid into a channel 402 or slot formed in one or more walls of the housing. The channel and/or the lock helps maintain the removable divider 400 in a predetermined position in the pet kennel.

The slide latch(es) may be operated by sliding into an opening formed in the housing to secure at least one divider in the predetermined position. The slide latch(es) may slide out of the opening formed in the housing to release the divider for removal from the containment area.

Still other configurations of the pet kennel are contemplated. For example, multiple dividers may be provided. The dividers may be solid or have openings (e.g., screen or bars) to enable the pet in one area to see another pet in another area of the kennel.

Figure 11:
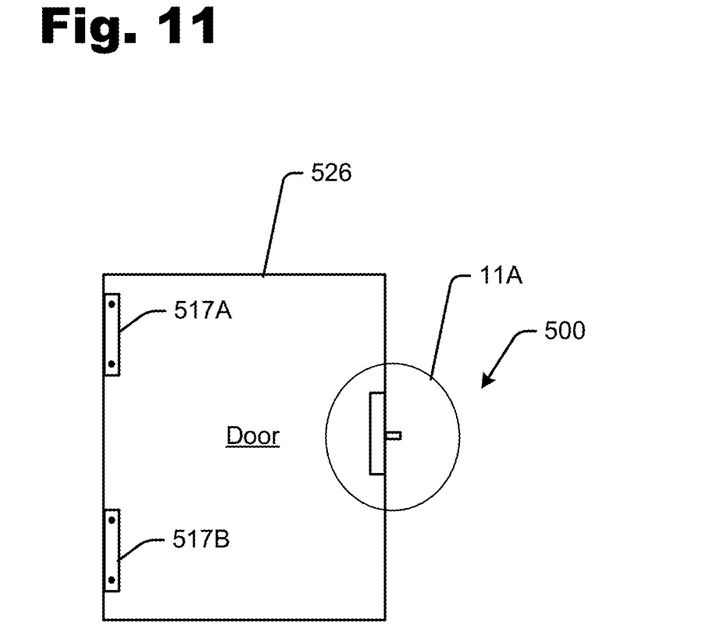
Figure 11A:
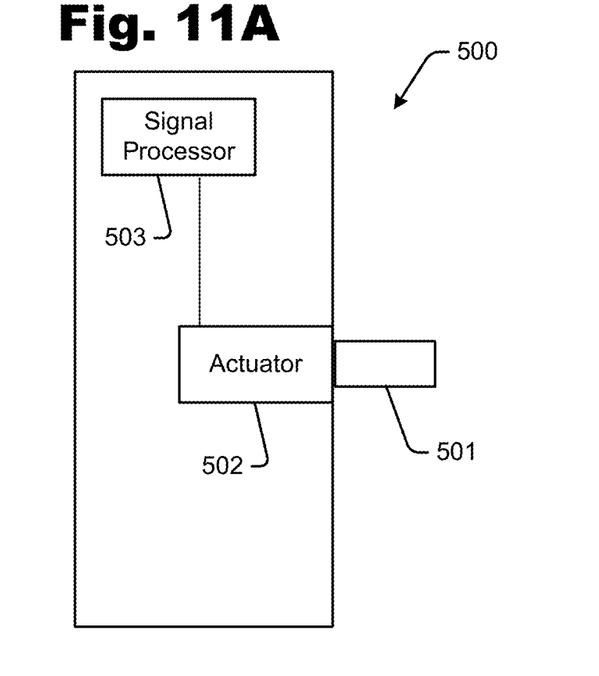

FIGS. 11-11A illustrate a lock actuator mechanism, wherein FIG. 11A is a detailed view of the portion shown in circle 11A in FIG. 11. In another example, the pet kennel may be provided with an automatic latching system 500 for the door(s) 526. The automatic latching system may be mounted on the opposite from hinges 517A-B. The automatic latching system 500 may include an actuated latch 501.

While the automatic latching system 500 may simply lock and unlock a door on the pet kennel, in another example, the automatic latching system 500 also open the door automatically. For example, the actuated latch 501 may be open with a spring-actuator 502. Other examples of actuators are also contemplated, e.g., based on other actuating mechanisms such as air, hydraulic, or motor driven latches.

Upon activating the latch 501, a spring or other bias on hinges 517A and 517B automatically biases the door 526 of the pet kennel to an open position. Actuated latching mechanisms are commercially available and therefore it is not described in more detail herein.

In an example, the automatic latching system 500 may be actuated based on receipt of a signal. The signal may be generated by a dedicated remote control, or from the user's mobile device (e.g., their mobile phone or tablet). Electronic controls (e.g., signal processor 503) provided with the automatic latching system may actuate the automatic latching system in response to receiving an input signal. As such, the user is able to open the door 526 to let the pet out without the user having to walk over to the pet kennel. Indeed, the user may open the door 526 to the pet kennel from a remote location (e.g., from their office to open the pet kennel door at home). For example, if the user cannot make it home on time to let the pet out of the pet kennel, the user may open the door to let the pet out to access food, water, or a "doggie" door to go outside of the house.

In another example, the automatic latching system may be actuated based on receipt of an emergency signal, such as a signal generated by a burglar alarm, smoke detector, carbon monoxide detector, etc. This enables the pet to escape from the pet kennel in the event of an emergency.

It is noted that the examples shown and described are provided for purposes of illustration and are not intended to be limiting. Still other examples are also contemplated.

The invention claimed is:
1. A pet kennel configured as an item of furniture, comprising:
  a housing having a floor, a top, and four sides, wherein the floor and the top are wooden;
  a containment area formed within the housing, the containment area sufficiently large to fit multiple animals;
  a solid back panel being one of the four sides of the containment area;

a first side being another one of the four sides of the containment area formed by a first frame with a first window opening therein;
a second side being another one of the four sides of the containment area formed by a second frame with a second window opening therein;
a front side being another one of the four sides of the containment area, the front side formed by a third frame having a third window opening therein and a fourth window opening therein;
a first door over a first opening through the third frame into the containment area;
a second door over a second opening through the third frame into the containment area; and
a plurality of vertical bars rigidly affixed to each of the first, second and third window openings, and to the first and second doors, the plurality of vertical bars spaced apart from one another so as to provide a view through the window openings and the first and second doors while still restricting the pet to the containment area;
at least one divider installed to separate the containment area into distinct living space, and the at least one divider removable to provide a common living space; and
a lock on the at least one divider, the lock including at least one slide latch sliding into an opening formed in the housing to secure the at least one divider in a predetermined position, and the at least one slide latch sliding out of the opening formed in the housing to release the at least one divider for removal from the containment area.

2. A pet kennel configured as an item of furniture, comprising:
a housing having a floor, a top, and four sides, wherein the floor and the top are wooden, and at least one of the sides has individual metal rods separated from one another and mounted in a wooden frame;
a containment area formed within the housing, the containment area sufficiently large to fit multiple animals;
at least one divider installed to separate the containment area into distinct living space, and the at least one divider removable to provide a common living space;
a lock on the at least one divider, the lock including at least one slide latch sliding into an opening formed in the housing to secure the at least one divider in a predetermined position, and the at least one slide latch sliding out of the opening formed in the housing to release the at least one divider for removal from the containment area;
at least one door to the containment area; and
a lock on the at least one door.

3. A pet kennel configured as an item of furniture, comprising:
a housing having a floor, a top, and four sides, wherein the floor and the top are wooden, and at least one of the sides has individual metal rods separated from one another and mounted in a wooden frame;
a first floor and a second floor, the first floor providing a lower containment area and the second floor providing an upper containment area, wherein the lower containment area and the upper containment area are distinct containment areas having separate doors to each of the lower containment area and the upper containment area;
at least one divider installed to separate the containment area into distinct living space, and the at least one divider removable to provide a common living space;
at least one door to the containment areas; and a lock on the at least one door.

* * * * *